No. 834,519. PATENTED OCT. 30, 1906.
J. W. HAIR.
PLOW.
APPLICATION FILED APR. 6, 1906.

3 SHEETS—SHEET 1.

Witnesses:

Inventor: J. W. Hair,

By Attorneys

No. 834,519. PATENTED OCT. 30, 1906.
J. W. HAIR.
PLOW.
APPLICATION FILED APR. 6, 1906.

3 SHEETS—SHEET 2.

Witnesses:
Inventor:
J. W. Hair,
By
Attorneys

No. 834,519. PATENTED OCT. 30, 1906.
J. W. HAIR.
PLOW.
APPLICATION FILED APR. 6, 1906.

3 SHEETS—SHEET 3.

Witnesses:
S. S. Burket
J. N. Mister

Inventor:
J. W. Hair,
By Louis Bagger & Co.,
Attorney

UNITED STATES PATENT OFFICE.

JOHN W. HAIR, OF SAN BERNARDINO, CALIFORNIA.

PLOW.

No. 834,519.  Specification of Letters Patent.  Patented Oct. 30, 1906.

Application filed April 6, 1906. Serial No. 310,379.

*To all whom it may concern:*

Be it known that I, JOHN W. HAIR, a citizen of the United States, residing at San Bernardino, in the county of San Bernardino and State of California, have invented certain new and useful Improvements in Plows, of which the following is a specification.

My invention pertains to improvements in plows, more especially what may be termed "sidehill."

Its object is to provide for effecting the plowing operation in either direction without bodily reversing the plow for that purpose and to carry out the same in a simple, economic, and effective manner.

Said invention consists of certain features substantially as hereinafter fully disclosed, and specifically pointed out by the claims.

Figure 1:
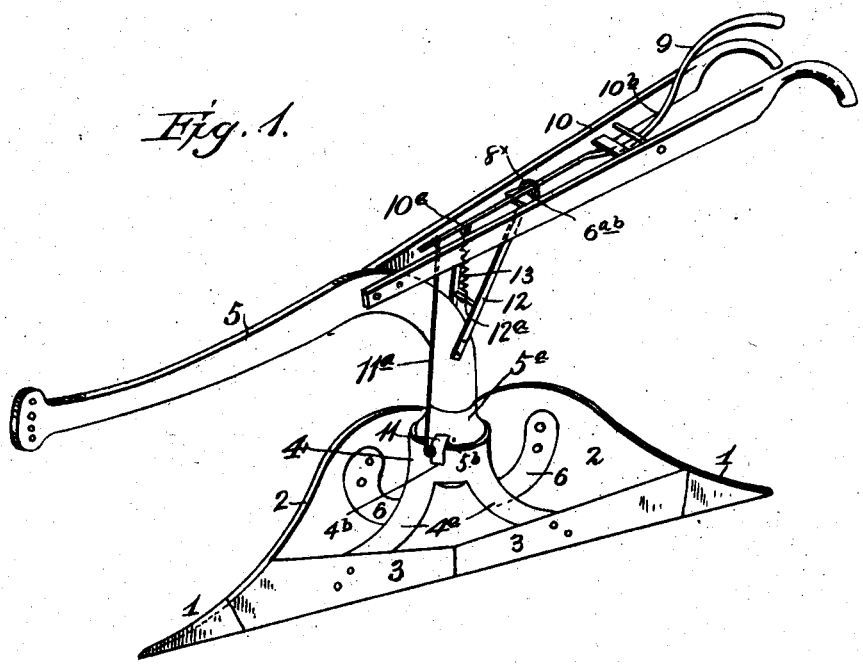
Figure 2:
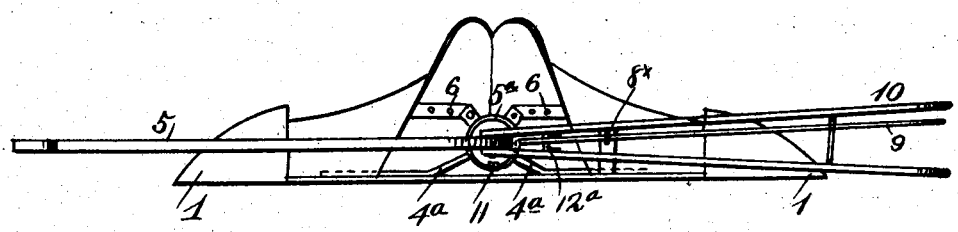
Figure 3:
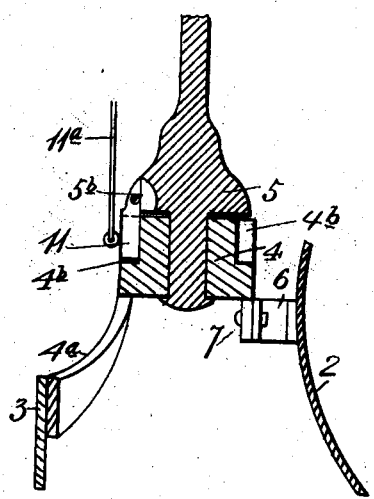
Figure 6:
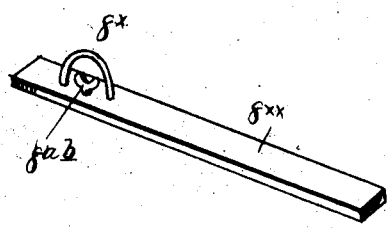
Figure 4:
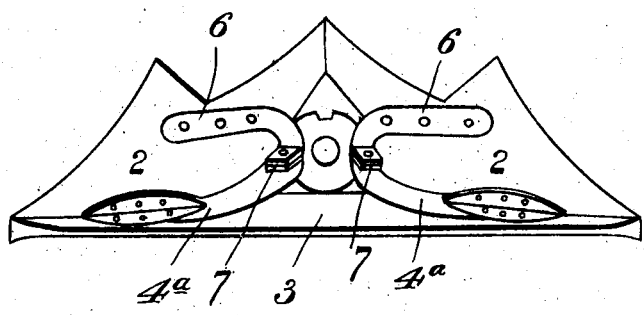
Figure 5:
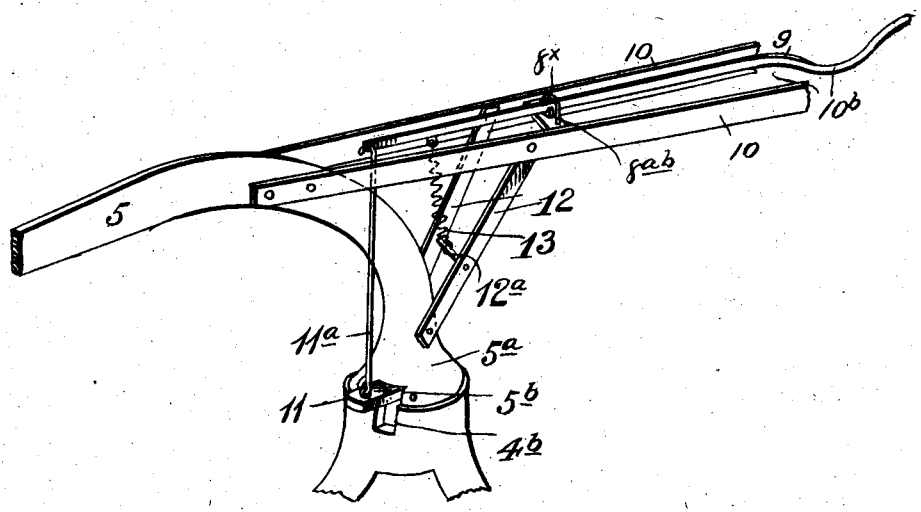

In the accompanying drawings, illustrating the preferred embodiment of my invention, Figure 1 is a landside view of the same. Fig. 2 is a plan view thereof. Fig. 3 is a vertical section produced through the corresponding portion of the beam and the socket member of the plow receiving said plow-beam. Fig. 4 is an enlarged detached view taken from the landside. Fig. 5 is an enlarged broken perspective view disclosing more particularly the handle-equipped lever and adjunctive means for use in reversing the plow-beam and its retention in place. Fig. 6 is a detailed perspective view of the fulcrum-equipped member for said lever.

In carrying out my invention I provide duplicate plow-point members 1, duplicate moldboard members 2, and a common landside member 3, all arranged back to back, as disclosed particularly by Fig. 1, thus forming what may be styled a "double" plow, or one for plowing in either direction. Said moldboard members and landside member have suitably secured thereto a socket casting or member 4, which receives the downturned inner end vertical portion $5^a$ of the plow-beam 5, the latter being cylindric and the opening in said socket member of corresponding outline, so that said plow-beam may pivot therein and be permitted to be swung laterally upon said socket-casting in changing or reversing the line of draft, as will be readily understood. Said socket-casting has branching off therefrom at its lower end downward-extending arms $4^a$, adapted to be suitably bolted to the landside 3 upon its inner surface for suitably disposing the first-noted with relation to the plane of the upper edges of the moldboard members. In effecting connection between said socket-casting and said moldboards brackets 6 are provided, each having one end suitably secured to the moldboards 2, respectively, and having their opposite ends suitably bolted to lugs 7, standing outward from the socket-casting 4.

A lever 9 is suitably arranged along or close to one of the handles 10 of the plow, further referred to later, and extends through a yoke $8^\times$, secured to a cross-bar $8^{\times\times}$, secured to said handles, said lever resting and fulcrumed upon a saddle $8^{ab}$, secured to said cross-bar within said yoke, the yoke serving for the proper retention in place of the lever and said saddle for facility of movement of the lever.

A latch 11 has one end let into a notch or recess $5^b$, produced in the part $5^a$ of the plow-beam 5, the outer end of said latch being adapted to enter a notch or recess $4^b$, formed in the socket-casting 4, and whereby said plow-beam may be retained in its effective position when the plow is in use. Said latch has connected thereto the lower end of a rod $11^a$, the upper end thereof being suitably connected to the lever 9 to permit, by the proper actuation of the latter, the disengagement of said latch from its receiving-notch in the socket-casting 4 when it may be required to "swing" the plow-beam in changing from a right-hand to a left-hand plow, or reversely, as well understood in performing the operation of plowing.

The handles 10 for manually guiding the action of the plow are suitably secured to the plow-beam near its inner end and braced in position by oblique bars or braces 12, connected to said plow beam and handles, and between these braces is secured a cross rod or bar $12^a$, having connected thereto one end of a spring 13. This spring has its opposite end connected to the lever 9 near its inner end preferably by an eye-ended bolt $10^a$, receiving an end-loop of the spring and itself suitably secured to the lever. Said spring is adapted to exert downward pressure upon the inner end of the lever 10 and accordingly deliver, through the rod connection $11^a$, corresponding pressure to the latch, and thus provide for normally retaining the latch in effective position.

The latch-actuating lever 10 is bowed downward, as at $10^b$, for conveniently receiving the grip of one hand as that hand is applied to one of the plow-handles 10, and whereby, by exerting pressure thereon, the lever will be so moved as to overcome the action of the spring 13 and move the rod $11^a$ upward, permitting the disengagement of the latch 11 from its notch $4^b$ in the socket-casting 4, when the plow-beam may be readily moved upon its axis for using either point of the plow end-to, as aforesaid.

In the use of my plow it is noted that it is not required to be lifted bodily out of the ground for reversing the direction of plowing and that there remain no "dead" furrows, as the same are termed, in effecting the plowing operation.

I claim—

1. A plow of the reversible or hillside type having a central socket-casting provided with branches at its lower end secured to the landside arms or brackets secured to the moldboards and said socket-casting, a plow-beam having a downturned rear end vertical portion pivoted in said socket-casting, a gravity-latch pivoted in a recess in said socket-casting, and means for actuating said latch, said socket-casting having opposed notches formed therein which notches are adapted to separately receive said latch as the latter is released and allowed to engage its receiving-notch by gravity.

2. A plow of the reversible or side hill type, having a central socket-casting, a plow-beam pivotally seated in said socket-casting and equipped with a latch adapted to engage a notch in said socket-casting, a spring-pressed hand-lever having a downward-bowed portion, and a rod connection with said latch, a yoke secured to a cross-bar between the plow-handles receiving said hand-lever, a "saddle" secured to said cross-bar, within said yoke, and forming the fulcrum of said lever.

In testimony whereof I have signed my name to this specification in the presence of two subscribing witnesses.

JOHN W. HAIR.

Witnesses:
W. E. BYRNE,
H. L. DICKSON.